Aug. 16, 1932.    R. STRESAU    1,872,193
METHOD OF EMBOSSING METAL PLATES
Filed Aug. 3, 1931
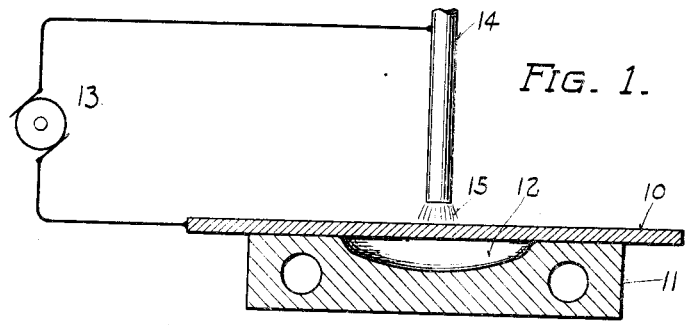
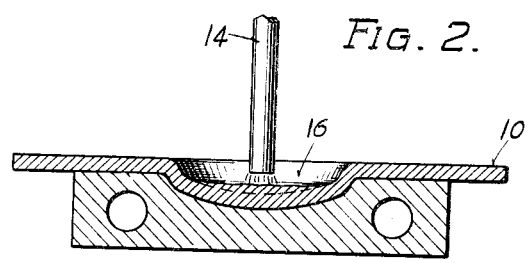
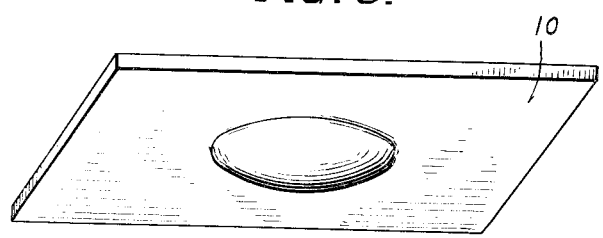
INVENTOR.
Richard Stresau
BY
ATTORNEY.

Patented Aug. 16, 1932

1,872,193

UNITED STATES PATENT OFFICE

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK

METHOD OF EMBOSSING METAL PLATES

Application filed August 3, 1931. Serial No. 554,816.

This invention relates to methods of forming embossments on metal plates.

Referring to the drawing:

Figure 1 is a diagrammatic view of the apparatus employed in carrying out the method in the preferred manner, the matrix and plate being shown in cross-section;

Fig. 2 is a cross-sectional view through the matrix and plate after the latter has been caused to assume the shape of the cavity in the matrix;

Fig. 3 is a perspective view of the finished plate; and

Fig. 4 is a cross-sectional view thereof.

According to the preferred method, a plate 10 is placed upon a mold or matrix 11 with the portion of the plate to be embossed disposed over a cavity 12 in the matrix. The cavity 12 is of a contour corresponding to the shape of the embossment to be formed on the plate 10.

The plate 10 is connected to one side of a source 13 of electrical current, and a weldrod 14 is connected to the other side of the source of electrical current. An arc 15 is then struck between the weldrod 14 and plate 10 and the heat generated by the arc causes the portion of the plate 10 above the cavity 12 to assume the shape of the cavity, as shown in Fig. 2, forming a depression 16 in the top of the plate. At the same time metal from the weldrod 14 will be deposited and fused to the plate 10 in the depression 16. The depression 16 is then completely filled with arc deposited metal from weldrod 14 and this metal is, at the same time, fused with the metal of the plate and the metal previously deposited by the arc.

By the practice of the above described method, it will be seen that embossments may be quickly and expeditiously formed on metal plates. The embossment formed may be utilized for any desired purpose and serves as a reenforcement of the plate at any point on the plate where the same will be subjected to increased strains. For example, such a reenforcement is particularly useful in a plate where it is to be drilled for the passage therethrough of a bolt, rivet, or other securing means.

While the invention has been described according to the preferred manner of carrying out the same, it is to be understood that variations and modifications may be resorted to without departing from the scope or spirit of the invention as defined by the following claims.

What is claimed and desired to be secured by Letters Patent is:

1. A method of forming embossments on metal plates which comprises disposing a plate on a matrix having a cavity therein corresponding to the shape of the embossment to be formed on said plate, reducing the metal of the plate over said cavity to a plastic state to cause the same to assume the shape of said cavity and form a depression in the plate, and depositing molten metal in said depression in the metal plate.

2. A method of forming embossments on metal plates which comprises disposing a plate on a matrix having a cavity therein corresponding to the shape of the embossment to be formed on said plate, striking an electric arc from a weldrod to the portion of said plate over said cavity to reduce said portion to a plastic state to cause the same to assume the shape of said cavity and thereby form a depression in said plate, and thereafter filling said depression with arc deposited metal.

3. A method of forming embossments on metal plates which comprises disposing a plate on a matrix having a cavity therein corresponding to the shape of the embossment to be formed on said plate, striking an electric arc from a weldrod to the portion of said plate over said cavity to simultaneously deposit and fuse weldrod metal to said plate and reduce said portion of said plate to a plastic state to cause the same to assume the shape of said cavity and also form a depression in said plate, and thereafter continuing to deposit and fuse weldrod metal to said plate in said depression until the latter is completely filled.

4. The method of forming embossments on metal plates which comprises forming a matrix having a cavity conforming to the shape of the embossment to be formed, placing the plate on the matrix with the portion to receive the embossment over the cavity, applying heat to the plate to flow the portion over the cavity into it causing a depression in the plate, and filling the depression with fused metal to form with the flowed metal of the plate a fused mass integral with the remainder of the plate.

5. The method of forming embossments on metal plates which comprises disposing a plate on a matrix having a cavity therein corresponding to the shape of the embossment to be formed, flowing the metal of the plate into the cavity, and thereafter completely filling the cavity with fused weldrod metal.

In witness whereof I have signed my name at Milwaukee, Wisconsin, this 1st day of August, 1931.

RICHARD STRESAU.